Nov. 5, 1957  B. R. MENNESSON  2,812,458
VARIABLE SPEED ELECTRIC GENERATORS IN PARTICULAR
FOR AUTOMOBILE VEHICLES
Filed June 22, 1956
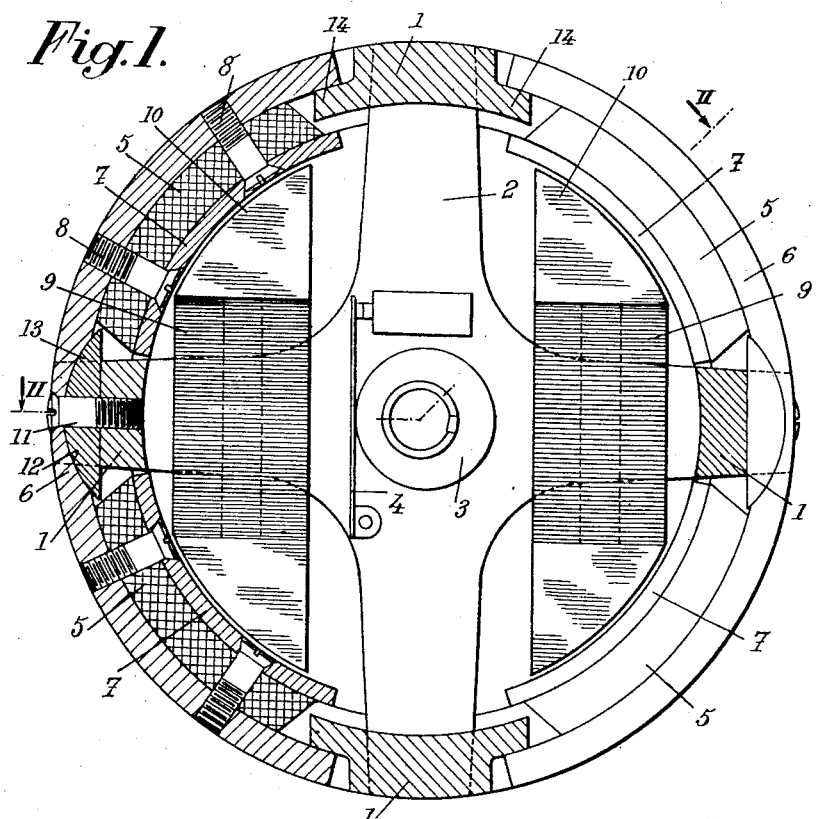
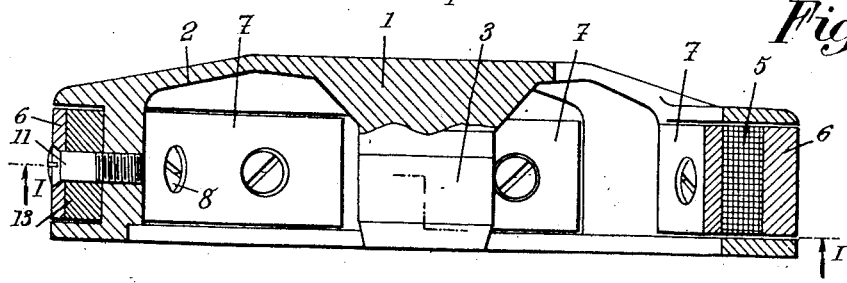
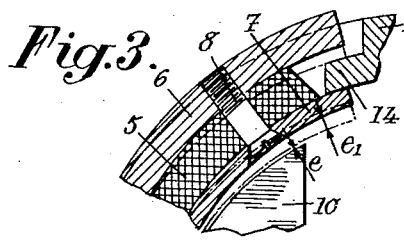 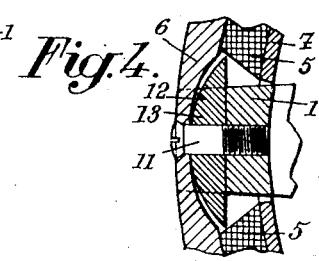
INVENTOR
Bernard René Mennesson
BY
Bailey, Stephens & Huettig
ATTORNEYS United States Patent Office 2,812,458
Patented Nov. 5, 1957

2,812,458

VARIABLE SPEED ELECTRIC GENERATORS IN PARTICULAR FOR AUTOMOBILE VEHICLES

Bernard René Mennesson, Neuilly-sur-Seine, France, assignor to Societe d'Appareils de Controle et d'Equipement des Moteurs S. A. C. E. M., Neuilly-sur-Seine (Seine), France, a society of France Application June 22, 1956, Serial No. 593,223

Claims priority, application France June 25, 1955

4 Claims. (Cl. 310—153)

The present invention relates to variable speed electric generators and it is more particularly but not exclusively concerned with such generators as used on automobile vehicles, and more especially motor cycles, for engine ignition and/or vehicle lighting.

The chief object of this invention is to provide a generator of this kind which is better adapted to meet the requirements of practice than those known up to this time and in particular such that the voltage of the current that is supplied is relatively little influenced by variations of the speed of rotation of the generator.

Such an electric generator essentially comprises a rotating permanent magnet inductor system and an armature.

According to my invention, it includes at least one resilient magnetic element deformable in response to variations of the centrifugal force applied thereto so as to reduce the magnetic flux acting upon said armature when the speed at which said inductor system is rotating increases and vice versa, as hereinafter described.

A preferred embodiment of my invention will be hereinafter described with reference to the appended drawing given merely by way of example and in which:

Fig. 1 is a sectional view on the line I—I of Fig. 2 of an electric generator made according to the invention, Fig. 1 further showing the armature which is not shown by Fig. 2.

Fig. 2 is a sectional view on the line II—II of Fig. 1, the armature being removed; in both of Figs. 1 and 2, the parts occupy the position corresponding to low speeds of rotation of the generator.

Figs. 3 and 4 are detail views showing portions of the structure of Fig. 1, the parts being shown in the positions corresponding to high speeds of rotation of the generator.

The electric generator illustrated by the drawing is of the type sometimes called "magnetic fly-wheel" such as used on motor cycles.

This generator includes a rotating permanent magnet inductor system forming the rotor and an armature stationary in a fixed support and forming the stator, this armature being constituted by windings for supplying with current the ignition spark plug or plugs of the vehicle and the lighting means of the vehicle.

As it is known, the voltage of the current supplied by a conventional magnetic fly-wheel increases when the number of revolutions per minute of the rotor increases, said number being proportional to the speed of the engine or of the vehicle.

Now, on the one hand, in order to obtain a satisfactory working of the ignition means, the voltage must be as high as possible for low speeds of the engine so as to facilitate starting thereof, but this voltage should not be too high at high speeds of the engine.

On the other hand, to have a good lighting system, the voltage should not vary too much so as to avoid subjecting the light bulbs to high voltages at high speeds and to obtain a sufficient lighting at low speeds.

The object of the present invention is to make the voltage obtained as little variable as possible.

For this purpose, the rotating inductor system of the generator includes at least one resilient magnetic element arranged to be deformed in response to variations of the centrifugal force applied thereto so as to reduce the magnetic flux acting upon the armature when the speed of rotation of the inductor system increases and vice versa.

This deformation of a magnetic element of the inductor may for instance be arranged so as to modify the air gap between the inductor magnets and the cores of the armature windings.

It may also be used to modify the section afforded to the passage of the magnetic lines of force through said element.

In the example illustrated by the drawing, both of these effects are used.

The rotor includes a body 1 made of a non-magnetic material, for instance zinc molded under pressure, such body 1 being connected by radial arms 2 with a hub 3 fixed on a driving shaft. The external periphery of hub 3 is given the shape of a cam so as to cooperate with a contact opening device 4 carried by the stator.

The inductor system includes four flat magnets 5 preferably of the ferrite type having their north-south directions at right angles to their surfaces of largest area, the north-south direction of one magnet being toward the hub and that of the next magnet away therefrom. Said magnets are grouped in two pairs and the two magnets of each pair are connected together by magnetic bridging members 6 extending over the outer peripheral end faces of said magnets. Each magnet is also provided with an inner pole piece 7 also made of a magnetic material and intended to facilitate a regular passage of the magnetic flux toward the armature. Magnets 5, extending between members 6 and pole pieces 7 are assembled together by means of screws 8.

The armature system includes two windings or coils 9, wound on cores the heads or ends 10 of which have their external surfaces in the form of portions of a cylinder having a diameter just a little smaller than that along which are disposed the inner faces of pole pieces 7, so as to leave an air gap $e$ between said core heads 10 and said pole pieces 7 (Fig. 3).

According to the present invention, the magnetic bridging members 6 are secured exclusively by their middle parts to rotor 1 and the characteristics of these elements 6 (nature of the magnetic metal of which they are made, cross section, and so on) are determined in such manner that for speeds of the rotor above a predetermined value, the centrifugal force acting thereon resiliently deforms the ends of said members 6 so as to increase the air gap which then becomes $e_1$ (Fig. 3).

For this purpose, each of the magnetic bridging members 6 is secured to the body 1 of the rotor by a single element such as a screw 11. Furthermore, preferably, as shown by the drawing, this screw 11 passes through a portion of the magnetic bridging member 6 which is made thinner than the remainder of said member due to the provision of a recess 12 in said part of member 6. The corresponding arm 2 of the rotor carries at its end a block 13 of a magnetic material which fits exactly in said recess 12 when member 6 is in its position of rest, screw 11 extending through said block 13.

Advantageously, in order to limit the deformations of the magnetic bridging members 6, the body 1 of the rotor is provided with projections 14 extending between the ends of said magnetic bridging members 6 and of pole pieces 7.

Such an electric generator works as follows.

When the engine of the vehicle is started, and at low speeds thereof, every pole piece 7 passes at a minimum distance e from the ends of the cores of windings 10, this distance being fixed by the normal tolerances possible for machining. Each magnetic bridging member 6 is bearing at its end upon the projections 14 due to the fact that said members 6 are slightly pre-stressed.

When the speed at which the rotor is rotating increases, the centrifugal force developed in masses 5, 6 and 7 increases and urges them outwardly. For a given speed, the ends of magnetic bridging members 6 cease to be in contact with projections 14. Consequently, the air gap between pole pieces 7 and the core heads increases (Fig. 3), which reduces the flux induced through every winding 10.

The deformation of each connecting pole piece 6 will take place by rotation about fixation screw 11 and, as soon as the ends of said member 6 leave projections 14, a gap will appear between the block 13 and member 6 which further reduces the flux transmitted between the two magnets 5 of each pair (Fig. 4).

When the speed reaches a given value and exceeds it, the ends of pole pieces 7 come to bear upon the projections 14 of the rotor, which limits the increase of the air gap and prevents any possibility of the magnetic bridging members 6 being broken.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the appended claims.

What I claim is:

1. An electric generator which comprises, in combination, an armature including at least two cores fixed with respect to each other, said cores having at their ends outer peripheral faces in the form of portions of surfaces of revolution about a common axis, and windings disposed around the portions of said cores intermediate between said ends thereof, and a rotating inductor system including a hub rotatable about said axis, at least two arms of a non-magnetic material extending radially from said hub, at least two pairs of magnets, each of said magnets having the shape of a flat body limited by two surfaces at least substantially parallel and coaxial to said core peripheral faces and surrounding them, the north-south direction of each of said magnets being perpendicular to said surfaces thereof and being toward said axis for one magnet and away from said axis for the next magnet, the arc over which the two magnets of a pair extend about said axis being substantially equal to the arc about which the peripheral face of one core extends, a common resilient magnetic bridging member extending between the ends of the two magnets of each pair substantially along one of said surfaces which limit said two last mentioned magnets, each of said resilient magnetic bridging members forming the only support of each pair of magnets and being fixed to one of said arms respectively, at the middle part of said magnetic bridging member exclusively, whereby an increase in the speed at which said inductor system is rotating about said axis causes said resilient magnetic bridging members to be deformed outwardly and thus to increase the air gap between said magnets and said cores, respectively.

2. An electric generator which comprises, in combination, an armature including at least two cores fixed with respect to each other, said cores having at their ends outer peripheral faces in the form of portions of surfaces of revolution about a common axis, and windings disposed around the portions of said cores intermediate between said ends thereof, and a rotating inductor system including a hub rotatable about said axis, at least two arms of a non-magnetic material extending radially from said hub, at least two pairs of magnets, each of said magnets having the shape of a flat body limited by two surfaces at least substantially parallel and coaxial to said core peripheral faces and surrounding them, the north-south direction of each of said magnets being perpendicular to said surfaces thereof and being toward said axis for one magnet and away from said axis for the next magnet, the arc over which the two magnets of a pair extend about said axis being substantially equal to the arc about which the peripheral face of one core extends, a common resilient magnetic bridging member extending between the ends of the two magnets of each pair substantially along that of said coaxial surfaces limiting said two last mentioned magnets which is on the outside of the other, each of said resilient magnetic bridging members forming the only support of each pair of magnets and being fixed to one of said arms respectively, at the middle part of said magnetic bridging member exclusively, whereby an increase in the speed at which said inductor system is rotating about said axis causes said resilient magnetic bridging members to be deformed outwardly and thus to increase the air gap between said magnets and said cores, respectively, each of said radial arms including, at the end thereof where is secured the middle part of one of said resilient magnetic bridging members, a rounded block of a magnetic material, and the inner face of said middle part of said resilient magnetic bridging member being provided with a recess in which said block is fitting when said resilient magnetic bridging member is at rest, the contacting surfaces of said block and said resilient magnetic bridging member being shaped so that the total cross section for the passage of magnetic lines of force through said block and the portion of said last mentioned magnetic bridging member in contact therewith decreases when said last mentioned magnetic bridging member is deformed outwardly in response to an increase of the speed at which said inductor system is rotating and vice versa.

3. An electric generator according to claim 2 in which said block has its outer face at least approximately in the shape of a portion of a sphere, the inner face of said resilient magnetic bridging member being provided with a recess of the same shape and curvature when said pole piece is undeformed, said resilient magnetic bridging member being secured to said block at a point located at the center of said recess and at the central point of said block outer surface.

4. An electric generator according to claim 1 further including cooperating means carried by the ends of each pair of magnets and by said hub respectively for limiting the displacements of said magnets with respect to said hub both inwardly and outwardly.

References Cited in the file of this patent
UNITED STATES PATENTS
1,921,841  Roberts _____ Aug. 8, 1933